United States Patent
Zöllner et al.

(10) Patent No.: US 9,896,605 B2
(45) Date of Patent: *Feb. 20, 2018

(54) METHOD OF PRODUCING A SELF-ADHESIVE TAPE HAVING A LAYER OF PHOTOINITIATOR-FREE PRESSURE-SENSITIVE ACRYLATE HOTMELT ADHESIVE

(71) Applicant: tesa SE, Hamburg (DE)

(72) Inventors: Stephan Zöllner, Nordheide (DE); Sven Hansen, Hamburg (DE); Kay Brandes, Kaltenkirchen-Moorkaten (DE); Jorg Speer, Wrist (DE)

(73) Assignee: TESA SE, Norderstedt (DE)

( * ) Notice: Subject to any disclaimer, the term of this patent is extended or adjusted under 35 U.S.C. 154(b) by 388 days.

This patent is subject to a terminal disclaimer.

(21) Appl. No.: 14/493,860

(22) Filed: Sep. 23, 2014

(65) Prior Publication Data

US 2015/0024132 A1 Jan. 22, 2015

Related U.S. Application Data

(62) Division of application No. 11/573,032, filed as application No. PCT/EP2005/054507 on Sep. 9, 2005, now abandoned.

(30) Foreign Application Priority Data

Sep. 9, 2004 (DE) .................. 10 2004 044 086

(51) Int. Cl.
  *B05D 5/10* (2006.01)
  *C09J 7/02* (2006.01)
  (Continued)

(52) U.S. Cl.
  CPC .......... *C09J 7/0217* (2013.01); *C08F 220/18* (2013.01); *C08G 18/0895* (2013.01);
  (Continued)

(58) Field of Classification Search
  CPC ..................................................... C09J 7/0217
  See application file for complete search history.

(56) References Cited

U.S. PATENT DOCUMENTS

| 4,943,461 A | 7/1990 | Karim |
| 5,648,425 A | 7/1997 | Everaerts et al. |

(Continued)

FOREIGN PATENT DOCUMENTS

| DE | 43 03 183 C | 7/1994 |
| DE | 198 46 902 | 5/2000 |

(Continued)

OTHER PUBLICATIONS

T.G. Fox, Bull. Am. Phys. Soc. 1 (1956) 123.

*Primary Examiner* — Xiao S Zhao
(74) *Attorney, Agent, or Firm* — Norris McLaughlin & Marcus P.A.

(57) ABSTRACT

The invention describes a double-sided, carrierless self-adhesive tape which can be used in particular for achieving very durable adhesive bonding of a variety of articles. This double-sided, carrierless self-adhesive tape is composed of a homogeneously crosslinked pressure-sensitive acrylate hotmelt composition of single-layer construction, which may have been lined with release materials such as siliconized release papers or release films. The double-sided, carrierless pressure-sensitive adhesive tape is characterized in that it is composed of a photoinitiator-free, thermally homogeneously crosslinked acrylate hotmelt which is crosslinked predominantly by way of urethane units. It is notable in particular for the fact that it is homogeneously chemically (Continued)

crosslinked through the layer and, in contrast to acrylate layers crosslinked by radiation (UV/EBC), does not exhibit any profile of crosslinking through the layer. It can be used in particular as an adhesive transfer tape for the permanent attachment of articles to a variety of substrates.

10 Claims, 3 Drawing Sheets

(51) Int. Cl.

| | | |
|---|---|---|
| C08F 220/18 | (2006.01) | |
| C08G 18/08 | (2006.01) | |
| C08G 18/62 | (2006.01) | |
| C08G 18/79 | (2006.01) | |
| C09J 133/04 | (2006.01) | |
| C09J 175/04 | (2006.01) | |
| C09J 133/08 | (2006.01) | |
| C08F 220/06 | (2006.01) | |
| C08F 220/26 | (2006.01) | |
| C08K 5/00 | (2006.01) | |
| C08K 5/29 | (2006.01) | |
| C08K 5/3492 | (2006.01) | |
| C08L 33/02 | (2006.01) | |

(52) U.S. Cl.
CPC ....... *C08G 18/6254* (2013.01); *C08G 18/792* (2013.01); *C09J 133/04* (2013.01); *C09J 133/08* (2013.01); *C09J 175/04* (2013.01); *C08F 220/06* (2013.01); *C08F 220/26* (2013.01); *C08G 2170/20* (2013.01); *C08K 5/0025* (2013.01); *C08K 5/29* (2013.01); *C08K 5/3492* (2013.01); *C08L 33/02* (2013.01); *C09J 2205/102* (2013.01); *C09J 2433/00* (2013.01); *Y10T 428/1352* (2015.01); *Y10T 428/1452* (2015.01); *Y10T 428/265* (2015.01); *Y10T 428/28* (2015.01); *Y10T 428/2848* (2015.01); *Y10T 428/31573* (2015.04); *Y10T 428/31855* (2015.04); *Y10T 428/31935* (2015.04)

(56) References Cited

U.S. PATENT DOCUMENTS

| | | |
|---|---|---|
| 5,710,215 A | 1/1998 | Abend |
| 5,767,210 A | 6/1998 | Lecomte et al. |
| 5,789,487 A | 8/1998 | Matyjaszewski et al. |
| 5,811,500 A | 9/1998 | Dubois et al. |
| 5,854,364 A | 12/1998 | Senninger et al. |
| 5,877,261 A | 3/1999 | Harder et al. |
| 5,945,491 A | 8/1999 | Matyjaszewski et al. |
| 6,114,482 A | 9/2000 | Senninger et al. |
| 6,150,017 A * | 11/2000 | Burmeister ................ C08J 3/20 428/355 R |
| 6,340,719 B1 | 1/2002 | Goeb et al. |
| 6,358,606 B1 * | 3/2002 | Sakai ...................... B32B 7/12 427/516 |
| 6,677,000 B2 | 1/2004 | Neuhas-Steinmetz et al. |
| 6,753,079 B2 | 6/2004 | Husemann et al. |
| 6,765,078 B2 | 7/2004 | Husemann et al. |
| 6,881,442 B2 | 4/2005 | Husemann et al. |
| 6,958,186 B2 | 10/2005 | Husemann et al. |
| 6,991,828 B2 | 1/2006 | Husemann et al. |
| 7,005,482 B2 | 2/2006 | Guse et al. |
| 7,084,185 B2 | 8/2006 | Husemann et al. |
| 2002/0164486 A1 | 11/2002 | Guse et al. |
| 2003/0017332 A1 | 1/2003 | Takizawa et al. |
| 2003/0082370 A1 | 5/2003 | Husemann et al. |
| 2003/0157337 A1 | 8/2003 | Abend |
| 2004/0092685 A1 | 5/2004 | Husemann et al. |
| 2005/0129936 A1 | 6/2005 | Husemann et al. |
| 2006/0057366 A1 | 3/2006 | Husemann et al. |

FOREIGN PATENT DOCUMENTS

| | | |
|---|---|---|
| DE | 10029554 | 1/2002 |
| DE | 10036901 | 4/2002 |
| DE | 10106630 | 8/2002 |
| DE | 101 63 545 | 7/2003 |
| DE | 102 21 402 | 11/2003 |
| DE | 10145229 | 8/2004 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 1 361 260 | 11/2003 |
| JP | 02178378 | 7/1990 |
| WO | 2004/050784 | 6/2004 |
| WO | 2005/059052 | 6/2005 |

* cited by examiner

METHOD OF PRODUCING A SELF-ADHESIVE TAPE HAVING A LAYER OF PHOTOINITIATOR-FREE PRESSURE-SENSITIVE ACRYLATE HOTMELT ADHESIVE

This is a Division of application Ser. No. 11/573,032 now pending, which is a 371 of PCT/EP2005/054507 filed 9 Sep. 2005 (international filing date), now abandoned.

The invention relates to a double-sided, carrierless self-adhesive tape which can be used in particular for achieving very durable adhesive bonds. The invention further relates to a method of producing an adhesive tape of this kind. The self-adhesive tape can be used in particular as an adhesive transfer tape.

BACKGROUND OF THE INVENTION

For industrial pressure-sensitive adhesive (PSA) tape applications it is very common to employ double-sided PSA tapes in order to join two materials to one another. A distinction is made here, depending on type, between single-layer double-sided self-adhesive tapes and multilayer double-sided self-adhesive tapes.

Single-layer double-sided self-adhesive tapes, known as transfer tapes, are constructed such that the PSA layer may indeed include fibers or fillers but contains no carrier and is lined only with corresponding release materials, such as siliconized release papers or release films. The term "adhesive transfer tape" derives from the transfer of the PSA attribute to a different material (profiles, foams, etc). Transfer tapes may be lined with release materials on one side or both sides. Often use is made of release papers or release films with different degrees of siliconization on either side, so that the transfer tape can be wound readily into a roll and then also applied readily. Such adhesive transfer tapes are frequently used in order to provide any of a very wide variety of substrates with pressure-sensitive adhesion. This is accomplished, for example, by laminating the transfer tape onto the substrate. In that case the release paper remains as a liner to the PSA layer in the product.

Transfer tapes are frequently produced from solution. These tapes are in general relatively thin, since at higher coatweights the layers may become blistery. It is known that conventional coating techniques for the production of PSA layers with a thickness of more than 100 μm, but in particular above 200 μm, are problematic. For instance, the drying of solvent-borne or water-based thick PSA layers is accompanied by formation of solvent blisters, thereby impairing the optical and the technical adhesive properties of the dried PSA layer. It is therefore necessary to reduce the coating rate when the amount of PSA to be applied is increased, which makes products produced in this way unprofitable.

Particularly for the production of relatively thick transfer tapes, solvent-free methods are of advantage. The technological operation of producing and coating PSAs is undergoing continual onward development. Within the industry, hotmelt methods with solvent-free coating technology are of growing importance for the production of PSAs. This development is being forced onward by evermore stringent environmental strictures and by rising prices for solvents. One aim of the development is therefore to eliminate solvents as far as possible from the manufacturing operation for PSA tapes. Furthermore, it avoids the problem of formation of blisters and other irregularities in the coatings. A particularly advantageous feature of the hotmelt technology is the facility for coating at very high speeds.

As the PSA of a transfer tape it is possible in principle to use any material possessing pressure-sensitive adhesion. Use is often made of compositions based on natural rubber, synthetic rubber, polyurethane or polyacrylate. With regard to the hotmelt technology, therefore, compositions based on styrene block copolymers are popular, on account of their rapid and efficient coatability. Coatings based on styrene block copolymers do not exhibit any profile of crosslinking through the layer. A disadvantage of PSA coatings based on styrene block copolymers, such as SIS, SBS, SEBS or SEPS, is their low UV stability and aging resistance. A particularly disadvantageous feature of transfer tapes based on styrene block copolymers is their very low heat resistance. Above about 70-90° C., depending on formulation, the compositions soften, and the bonds fail. The acrylate block copolymer-based compositions being newly developed at present are significantly more resistant to aging. Moreover, they allow water-clear, transparent, pressure-sensitively adhesive coatings. However, since they are crosslinked only physically via styrene or methyl methacrylate domains, these systems also soften as soon as the application temperature is above the softening temperature of the domains. Both systems are unsuitable for applications at relatively high temperatures.

For high-end industrial applications, preference is given to crosslinked polyacrylates, on account of their water-clear transparency and weathering stability. Moreover, because of their saturated polymer backbone, polyacrylates are very aging-resistant, insensitive to alteration by irradiation with UV or sunlight, stable to ozonolysis, and, depending on comonomer composition, inherently pressure-sensitively adhesive. Blending with migratable constituents such as resins and plasticizers is often unnecessary. Crosslinked polyacrylates are highly resistant to a shearing load, even at high temperatures.

In the prior art, solvent-free, acrylate-based transfer tapes are frequently produced by methods involving radiation chemistry. For example, transfer tapes can be produced by UV prepolymerization or UV crosslinking of hotmlet PSAs. All of these products exhibit a gradient of crosslinking through the layer.

DE 43 03 183 A1 describes a method of producing thick PSA layers, especially for producing high-performance self-adhesive articles. In said process a mixture of starting monomers which is to be polymerized by means of UV radiation is mixed, and thickened in the process, with a solvent-free, saturated photopolymerizable polymer, and then this mixture is applied to a dehesively treated carrier and exposed to UV radiation. A disadvantage is the use of copolymerized or added photoinitiators, since the layers may undergo yellowing and, in the event of UV exposure prior to use, may suffer marked changes in the technical adhesive properties. In that case it is necessary to go to considerable effort and expense—by means, for example, of UV-impervious packaging—to ensure that the customer obtains a uniformly high bonding performance. Moreover, in the event of bonding on UV-transparent substrates, such as on window glass or transparent plastic surfaces, for example, there is a risk that layers containing photoinitiator will undergo aftercrosslinking. This does result initially in an increase in bond strength, but further crosslinking causes the layers to become paintlike and undergo embrittlement. Sooner or later, this leads to the failure of the bond, particularly under a shearing load.

A disadvantage in the case of all radiation-crosslinked layers, and especially in the case of UV-crosslinked layers, is a more or less strongly pronounced profile of crosslinking through the layer. Toward the irradiation source, the UV-crosslinked layer is always more strongly crosslinked than on the side opposite the UV radiation source. The degree of the crosslinking profile is dependent for example on the layer thickness, on the wavelength of the photoinitiator that is used, and also on the wavelength of the radiation emitted by the UV radiation source.

DE 198 46 902 A1 and DE 101 63 545 A1 propose using EBC (electron beam) irradiation or UV irradiation from both sides in order to reduce the resulting crosslinking profile and to provide virtually homogeneous crosslinking of thick UV-crosslinkable acrylate PSA layers in particular. However, even the layers produced in this way have a crosslinking profile, and, moreover, the process is very costly and inconvenient.

EBC-crosslinked layers always exhibit a profile of crosslinking in accordance with the layer thickness and the material. With EBC-crosslinked layers as well it is impossible to set the crosslinking exactly. Nevertheless, EBC crosslinking proceeds without added photoinitiators, thereby removing some, although not all, of the disadvantages associated with the UV-irradiated layers. Depending on the accelerator voltage and on the thickness of the material to be irradiated, it is possible to vary the thickness of the irradiated layer. Layers above about 500 µm in thickness, particularly if filled with inorganic fillers such as glass balls, for example, can no longer be economically irradiated, and so there is an upper limit on the PSA layer thicknesses of PSA tapes.

For some time, UV-crosslinkable hotmelt PSAs have been available commercially under the trade name acResin®. On account of their relatively low weight-average molecular weight ($M_w$ approximately 200 000-300 000 g/mol), these compositions lend themselves to very effective coating and subsequent crosslinking by UV irradiation. Disadvantages, however, are again the inhomogeneity of the crosslinking through a dose profile, and also a low level of efficiency in the case of resin-modified acrylate compositions, and the limitation on layer thickness to well below 100 µm, which rules out use for substantial areas of industrial adhesive tapes.

In accordance with prior art, transfer tapes are also produced by an operation of two-stage UV polymerization, but one which has decisive disadvantages. In the first step of that process a mixture based on acrylate monomers is prepolymerized to a conversion of approximately 10%-20% by UV irradiation in a reactor in the presence of a photoinitiator. Alternatively, this "acrylic syrup" can also be obtained by thermally initiated free radical polymerization. In the second step this acrylic syrup, optionally after further photoinitiators, fillers, hollow glass balls, and crosslinkers have been added, is coated between antiadhesively coated UV-transparent films, and is polymerized to a higher degree of conversion on the web, by means of repeated UV irradiation, and in the course of this polymerization it is crosslinked.

The production of "relatively thick" viscoelastic layers in particular must in many cases be carried out in the absence of oxygen. In that case the composition is protected by a lining of film material, and UV initiation takes place through the films. PE and PP films which are sometimes used for this purpose deform under the conditions of crosslinking reaction (in the case of UV-initiated polymerization, heat of reaction is liberated, and can cause deformation of non-temperature-resistant film) and are therefore poorly suited. UV-transparent films such as PET are more thermally stable; in this case, however, it is necessary to add to the composition a photoinitiator which reacts to longwave radiation, in order for the reaction to take place. As a consequence of this, these layers have a tendency to undergo aftercrosslinking under UV light or sunlight. This process negates the advantage specific to the polyacrylate as a material. A further disadvantage is that fillers not transparent to UV cannot be used. Moreover, as a result of the process, there remains a high residual monomer fraction in these products. Possible reduction of residual monomer through a reduction in coating speed or through intensive subsequent drying is not very economic. The maximum achievable layer thickness is very heavily dependent on the wavelength of the photoinitiator used. Layers can be produced of up to about 1 mm, albeit with the disadvantages specified above. Layers any thicker than this are virtually impossible to obtain.

Transfer Tapes which have been Produced by Two-Stage UV Polymerization Also Exhibit a Profile of Crosslinking Through the Layer.

A disadvantage of transfer tapes which exhibit a profile of crosslinking through the layer is their inadequate capacity for distributing stresses in a uniform way. One side is always either overcrosslinked or undercrosslinked. An exact balance can never be struck between adhesive and cohesive properties for the entire layer, but only for a small section.

It is an object of the invention, accordingly, to overcome the disadvantages of the prior art and to provide transfer tapes which do not exhibit any profile of crosslinking through the layer.

SUMMARY OF THE INVENTION

This object is achieved by means of a homogeneous—especially thermally—crosslinked self-adhesive tape without permanent carrier, which has at least one layer of a photoinitiator-free, crosslinked, pressure-sensitive acrylate hotmelt adhesive. Very advantageously the pressure-sensitive acrylate hotmelt adhesive layer has been coated at least onto a temporary carrier, in particular a release material. "Homogeneous crosslinking" means that the pressure-sensitive acrylate hotmelt adhesive layer does not exhibit any profile of crosslinking through the layer. Thermal crosslinking is outstandingly suitable for allowing a homogeneous crosslinking profile through the layer.

BRIEF DISCUSSION OF THE DRAWINGS

Figure 3:
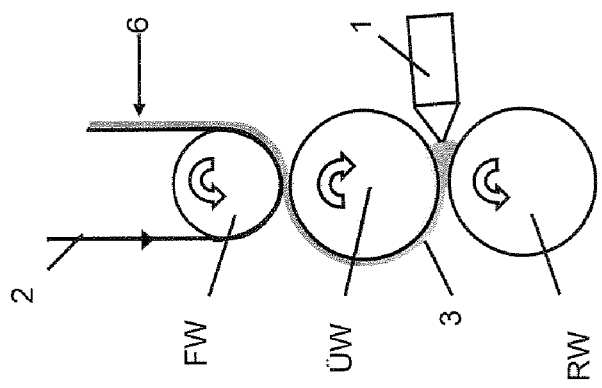

FIG. 3. illustrates a three-roll appliator.

Figure 4:
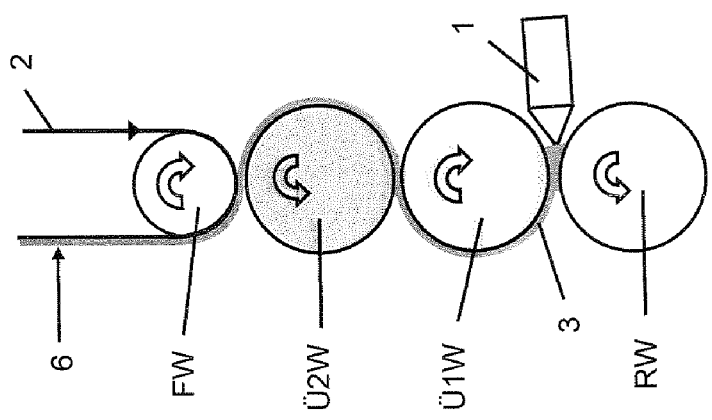

FIG. 4 illustrates a four-roll calender in co/co-roatation.

Figure 5:
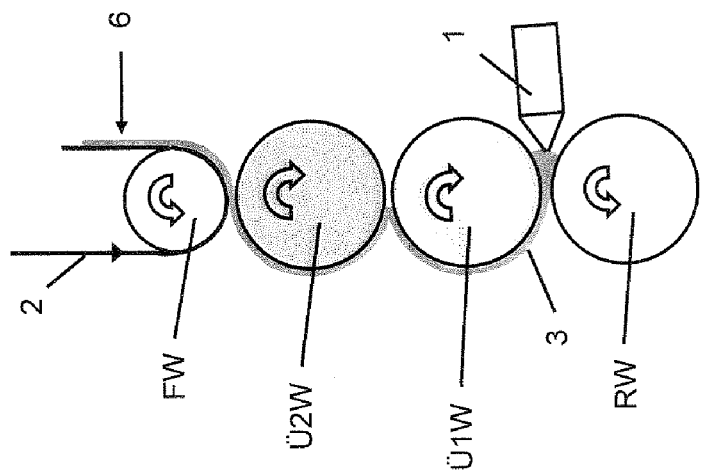

FIG. 5. illustrates a four-roll calender in co/counter-rotation.

DETAILED DESCRIPTION

Temporary carriers (or temporary carrier material) are those carriers (or carrier materials) which, although present for the production, transport and/or storage operations, are nevertheless removed again for the actual operation of bonding of the substrates to be bonded.

In contrast, permanent carriers are those carriers which, as part of the self-adhesive tape, are incorporated firmly within it and remain part of the adhesive tape in the bonded state as well.

In one preferred embodiment of the invention the self-adhesive tape is formed by the pressure-sensitive acrylate hotmelt adhesive (single-layer construction).

Unlike UV-crosslinked and EBC-crosslinked systems, the self-adhesive tape with the at least one homogeneously crosslinked pressure-sensitive hotmelt adhesive layer is not subject by virtue of its method to any restriction on layer thickness, in principle.

Advantageous embodiments of the self-adhesive tape of the invention feature pressure-sensitive acrylate hotmelt adhesive layer thicknesses of 50 to 5000 µm, in particular 100 to 2000 µm. Thicknesses deviating from these values are also possible in accordance with the invention; the self-adhesive tape of the invention in particular may also be particularly thick.

The self-adhesive tape of the invention may be unfilled, resin-modified, filled or foamed. For foaming it is advantageous if, for example, solid glass beads, hollow glass beads or expanding microballoons have been added to the pressure-sensitive acrylate hotmelt adhesive.

With different advantageous designs of the self-adhesive tape, the features of the individually stated embodiments of the invention can also be combined with one another.

In another preferred embodiment the crosslinking is brought about by means of crosslinking sites which are formed predominantly via urethane units. These result in particular from a crosslinking reaction of isocyanates containing primary hydroxy units, and arise as a result of a preferred procedure which advantageously allows the thermal crosslinking of PSAs.

Advantageously the self-adhesive tape is obtained by adding at least one thermal crosslinker to a polyacrylate copolymer (referred to below simply as "polyacrylate") based on acrylic esters and/or methacrylic esters in the melt, the polyacrylate with the crosslinker added is conveyed to a coating unit, where coating takes place onto a temporary carrier material. The crosslinking of the polyacrylate takes place preferably on the carrier. With preference in accordance with the invention, part of the acrylic esters and/or methacrylic esters contains primary hydroxyl groups. With further inventive preference, the thermal crosslinker is added in an extruder prior to the coating operation.

In one very advantageous embodiment the added thermal crosslinker is an isocyanate, preferably a trimerized isocyanate. With particular preference the trimerized isocyanates are aliphatic or amine-deactivated isocyanates.

Suitable isocyanates are, in particular, trimerized derivatives of MDI [4,4-methylenedi(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], examples being the products Desmodur® N3600 and XP2410 (each from BAYER AG: aliphatic polyisocyanates, low-viscosity HDI trimers). Also highly suitable is the surface-deactivated dispersion of micronized trimerized IPDI that is BUEJ 339®, now HF9® (BAYER AG).

Also suitable in principle for crosslinking, however, are other isocyanates, such as Desmodur VL 50 (MDI-based polyisocyanates, Bayer AG), Basonat F200WD (aliphatic polyisocyanate, BASF AG), Basonat HW100 (water-emulsifiable polyfunctional isocyanate based on HDI, BASF AG), Basonat HA 300 (allophanate-modified polyisocyanate on isocyanurate. HDI basis, BASF) or Bayhydur VPLS2150/1 (hydrophilically modified IPDI, Bayer AG), this recitation not being conclusive.

A preferred procedure is to use the thermal crosslinker, in particular the trimerized isocyanate, at 0.1% to 5% by weight, in particular at 0.2% to 1% by weight, based on the polyacrylate.

In one further development of the method of the invention the temperature of the polyacrylate when the thermal crosslinker is added is between 60° C. and 120° C., more preferably between 70° C. and 100° C.

Advantageously the residual monomer content of the polyacrylate when the thermal crosslinker is added is not more than 1% by weight, in particular not more than 0.3% by weight, based on the polyacrylate.

The fraction of the acrylic and/or methacrylic esters containing primary hydroxyl groups is in a preferred procedure up to 25% by weight, based on the polyacrylate.

Advantageously the residual solvent content of the polyacrylate after concentration and when the thermal crosslinker is added is not more than 1% by weight, in particular not more than 0.3% by weight, based on the polyacrylate.

In the case of functionalized acrylate copolymers containing copolymerized acrylic acid, the reaction rate of the crosslinking reaction is faster. Successful here is an operationally stable operation preferably with the slower aliphatic isocyanates or surface-deactivated isocyanate emulsions.

For the self-adhesive tape of the invention, it is preferred to use a polyacrylate which can be traced back to the following reactant mixture:

a1) acrylic esters and/or methacrylic esters of the following formula
$CH_2=CH(R^I)(COOR^{II})$
where $R^I=H$ or $CH_3$ and $R^{II}$ is an alkyl chain having 1 to 20 C atoms, with a fraction of 65%-99% by weight, a2) acrylates and/or methacrylates whose alcohol component contains at least one primary hydroxyl group, and/or vinyl compounds which are copolymerizable with acrylates and contain at least one primary hydroxyl group, with a fraction of 1% to 20% by weight, a3) and, if the fractions of a1) and a2) do not add up to 100% by weight, olefinically unsaturated monomers containing functional groups, with a fraction of 0% to 15% by weight.

The monomers are preferably chosen such that the resulting polymers have a glass transition temperature, of $T_g$, −50° C. to +10° C., understood to be a dynamic glass transition temperature for amorphous systems and to be the melting temperature for semicrystalline systems, and being determinable by means of dynamic mechanical analysis (DMA) at low frequencies.

In order to obtain a correspondingly preferred polymer glass transition temperature, $T_g$, of −50° C. to +10° C., and in accordance with the above remarks, the monomers are very preferably selected, and the quantitative composition of the monomer mixture advantageously chosen, in such a way as to result in the desired $T_g$ value for the polymer in accordance with an equation (E1) in analogy to the Fox equation (cf. T. G. Fox, Bull. Am. Phys. Soc. 1 (1956) 123).

$$\frac{1}{T_g} = \sum_n \frac{w_n}{T_{g,n}} \qquad (E1)$$

In this equation, n represents the serial number of the monomers used, $w_n$ the mass fraction of the respective monomer n (% by weight), and $T_{g,n}$ the respective glass transition temperature of the homopolymer of the respective monomer n, in K.

With great preference use is made for a1) of acrylic or methacrylic monomers which are composed of acrylic and methacrylic esters having alkyl groups of 1 to 20 C atoms, preferably 4 to 9 C atoms. Specific examples, without wishing to be restricted by this recitation, are methacrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, such as isobutyl acrylate, 2-ethylhexyl acrylate, 2-ethylhexyl methacrylate, isooctyl acrylate, and isooctyl methacrylate, for example. Further classes of compound to be used for a1) are monofunctional acrylates and/or methacrylates of bridged cycloalkyl alcohols, composed of at least 6 C atoms. The cycloalkyl alcohols may also be substituted, as for example by C-1-6 alkyl groups, halogen atoms or cyano groups. Specific examples are cyclohexyl methacrylates, isobornyl acrylate, isobornyl methacrylates and 3,5-dimethyladamantyl acrylate.

Great preference is given to using, for a2), monomers which contain hydroxyl groups, very preferably primary hydroxyl groups. Examples of a2) are hydroxyethyl acrylate, hydroxyethyl methacrylate, hydroxypropyl acrylate, hydroxypropyl methacrylate, 6-hydroxyhexyl methacrylate, 4-hydroxystyrene, and ally alcohol, this recitation not being conclusive.

Monomers for a3) are, for example, olefinically unsaturated monomers having functional groups such as carboxylic acid groups, acid anhydride groups, phosphonic acid groups, amide or imide or amino groups, isocyanate groups, epoxy groups or thiol groups. Examples of a3) are acrylic acid or methacrylic acid, maleic anhydride, itaconic anhydride, itaconic acid, glyceridyl methacrylate, glyceryl methacrylate, vinyl acetic acid, β-acryloyloxypropionic acid, trichloroacrylic acid, fumaric acid, crotonic acid, aconitic acid, acrylonitrile dimethylacrylic acid, N,N-dialkyl-substituted amides, such as N,N-dimethylacrylamide, dimethylmethylacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(buthoxymethyl)methacrylamide, N-methylolacrylamide, N-(ethoxymethyl)acrylamide, and N-isopropylacrylamide, this recitation not being conclusive.

In the inventive method of producing crosslinked polyacrylates, the reactive crosslinkers are added, to the polyacrylate that is to be crosslinked, very preferably under precise temperature and time control. The composition is conveyed to a coating unit and transferred to a carrier, preferably by means of two-roll, multi-roll or nozzle coating.

The time after the crosslinking system has been metered in the compounding assembly until the composition is shaped and applied to a carrier is referred to as the processing time. Within this time, the pressure-sensitive adhesive, which is now crosslinking, can be coated without gel and with a good visual coating appearance. Crosslinking then takes place primarily after the coating operation on the web under mild conditions, which are harmful neither to carrier nor to liner, and hence in particular without the influence of actinic radiation (such as UV irradiation or electron beams).

Presented below are a number of inventively advantageous method steps which can be used individually or in combinations of single or of all method steps for an enhanced improvement of the method sequence.

For the inventive self-adhesive tapes, especially adhesive transfer tapes, those polyacrylates which are particularly suitable are polyacrylates which have been prepared by bulk, solution or emulsion polymerization and if desired have been subsequently concentrated, particularly if they contain volatile constituents. Very preferred polyacrylates are those which have also been produced by solution polymerization and subsequently concentrated in a devolatilizing extruder in the same way as described in laid-open specification DE 10221402.6, page 3, line 22-68. In one preferred procedure the polyacrylates have a weight-average molecular weight $M_w$ of at least 300 000 g/mol up to a maximum of 1 500 000 g/mol. The average molecular weight is determined by size exclusion chromatography (GPC) or matrix-assisted laser desorption/ionization coupled with mass spectrometry (MALDI-MS). The polyacrylates comprise at least one comonomer which contains one or more primary hydroxyl groups. It can be advantageous to carry out the polymerization in the presence of regulators such as thiols, halogen compounds, and, in particular, alcohols (isopropanol), in order to set the desired weight-average molecular weight $M_w$.

The polymerization time, depending on conversion and temperature, is between 2 and 72 hours.

Also particularly suitable for the inventive process are polyacrylates which have a narrow molecular weight distribution (polydispersity <4). These compositions have a particularly high shear strength after crosslinking for a relatively low molecular weight. Given that, in comparison to a normally distributed polyacrylate, a narrow-distribution polyacrylate needs a lower molecular weight for the same level of cohesion, there are reductions in viscosity and in operating temperatures. Hence a narrow-distribution polyacrylate allows a particularly long processing time.

Narrow-distribution polyacrylates can be prepared by anionic polymerization or by controlled free-radical polymerization methods, the latter being especially suitable. Examples are described in U.S. Pat. No. 6,765,078 B2 and DE 10036901 A1 or US 2004/0092685 A1. Atom transfer radical polymerization (ATRP) as well can be used with advantage to synthesize narrow-distribution polyacrylates, the initiator used preferably comprising monofunctional or difunctional secondary or tertiary halides and the halide or halides being abstracted using complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in specifications U.S. Pat. No. 5,945,491 A, U.S. Pat. No. 5,854,364 A, and U.S. Pat. No. 5,789,487 A.

With particular suitability for the self-adhesive tapes of the invention it is also possible for macromonomers, as hardening comonomers, to have been copolymerized into the polyacrylate. Particularly suitable macromonomers are those as described in EP 1 361 260 A1, such as 2-polystyrene-ethyl methacrylate having a molecular weight $M_w$ of about 13 000 g/mol. Self-adhesive tapes based on macromonomer-modified thermally crosslinked acrylate hotmelts are notable for good coating qualities and increased cohesion.

Optionally it is possible to add the typical tackifying resins to the polyacrylate in the melt or even prior to concentration in solution. As tackifying resins for addition it is possible without exception to employ all tackifier resins that are known and have been described in the literature. As representatives mention may be made of the pinene resins, indene resins, and rosins, their disproportionated, hydrogenated, polymerized, and esterified derivatives and salts, the aliphatic and aromatic hydrocarbon resins, terpene resins and terpene phenolic resins, and also $C_5$, $C_9$, and other hydrocarbon resins. Any desired combinations of these and further resins may be used in order to adjust the properties of the resultant adhesive in accordance with what is desired. With particular advantage it is possible to use all resins which are compatible (soluble) with the corresponding polyacrylate, reference being made in particular to all aliphatic, aromatic, and alkylaromatic hydrocarbon resins, hydrocarbon resins based on single monomers, hydrogenated hydrocarbon resins, functional hydrocarbon resins, and natural resins. A preferred terpene phenolic resin, for example, is Dertophene T 110, a preferred hydrogenated rosin derivative Foral 85.

As a further option it is also possible to add powder-form and granular fillers, dyes, and pigments, including not least abrasive and reinforcing varieties, such as chalks ($CaCO_3$), titanium dioxides, zinc oxides, and carbon blacks, for example. With preference it is possible to use various forms of chalk as filler, particular preference being given to the use of Mikrosohl chalk (from Söhlde). At preferred fractions of up to 20% by weight, there is virtually no change caused by the addition of filler to the technical adhesive properties (shear strength at RT, instantaneous bond strength on steel and PE). Likewise with preference it is possible to add various organic fillers, such as any of a very wide variety of polymeric beads.

In addition it is possible for fillers of low flammability, such as ammonium polyphosphate, for example, and also electrically conductive fillers, such as conductive carbon black, carbon fibers and/or silver-coated beads, for example, and also ferromagnetic additives, such as iron(III) oxides, for example, aging inhibitors, light stabilizers and/or ozone protectants to be added or incorporated by compounding into the polyacrylate before or after the latter has been concentrated.

Optionally it is possible to add the typical plasticizers. Examples of plasticizers which can be metered in include low molecular mass polyacrylates, phthalates, water-soluble plasticizers, plasticizer resins, phosphates or polyphosphates.

The addition and incorporation of the thermally reactive crosslinking system into the polyacrylate matrix takes place in continuous compounding assemblies. In accordance with the invention these assemblies are designed so that, with thorough commixing and simultaneously low introduction of shearing energy, a short residence time is ensured for the composition after the crosslinking system has been metered. The compounding assemblies are preferably extruders, especially twin-screw extruders and/or planetary roller extruders. It is particularly advantageous if the spindles of the extruder are heatable and/or coolable.

The crosslinkers are added at one or more locations in the assemblies, preferably in unpressurized zones. It is also favorable if the thermally reactive crosslinker substances are added in finely divided form to the polyacrylate, such as in the form of aerosol, in fine droplets, or in dilution in a suitable diluent such as a polymer-compatible plasticizer.

Where the resultant hotmelt PSA is to be additized, it is sensible to add solid glass beads, hollow glass beads or expanding microballoons to the polyacrylate, preferably before the addition of the thermal crosslinker. Where expanding microballoons are used, the composition or the shaped layer is activated in a suitable way by means of introduction of heat.

In a further method step, which may take place in addition to the adding of the aforementioned adjuvants, but may also take place independently of said adding, the hotmelt PSA can be foamed by introduction of compressed gases such as carbon dioxide, air or nitrogen or of expandants. It is sensible, moreover, to carry out smoothing of the foamed layers after foaming, by means of rolls or release papers or release films.

Figure 1:
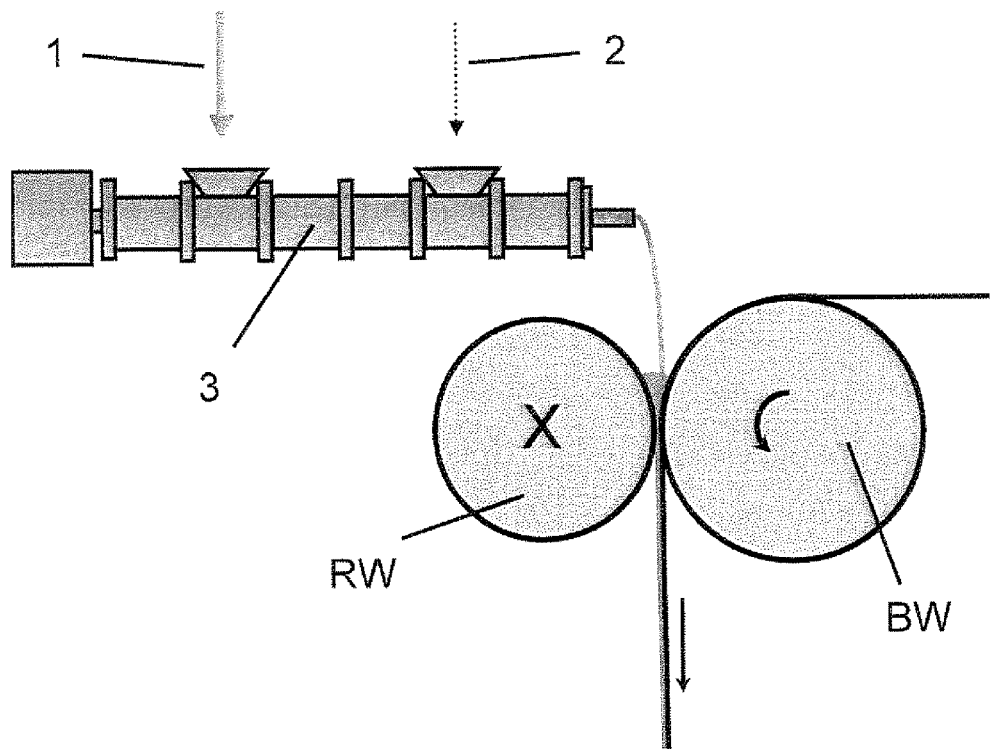
FIG. 1 is a diagrammatic representation of the process for producing the adhesive tape of the invention with a two-roll calender.

The polyacrylate with added crosslinker is conveyed to a coating unit, more preferably comprising an extruder, and more preferably still comprising the compounding extruder in which the crosslinker has already been added and in which, where appropriate, the concentration of the polyacrylate has already taken place; cf. in this respect the diagrammatic representation in FIG. 1, where the definitions are as follows: 1.1 introduction of polyacrylate, 1.2: addition of crosslinker, 1.3: extruder, RW: doctor roll; BW: coating roll).

It is therefore advantageous in accordance with the invention to realize the concentration of the polyacrylate, the addition and compounding of crosslinker, and the transport of composition in a single extruder or in extruder lines, so that, starting from the solvent-containing base polymer, the ready-compounded, largely solvent-free, resin-blended, filler-blended and crosslinker-blended self-adhesive composition of the invention is obtained at the exit of the extruder or extruder line without additional production steps, and is then supplied to the coating operation.

The coating of the self-adhesive compositions is carried out preferably using roll applicators, also called coating calenders. The coating calenders may consist of two, three or more rolls. Different embodiments that are inventively suitable are described below. The indication of the coating methods is not, however, intended to subject the invention to any unnecessary restriction.

Version A: Two-Roll Applicator FIGS. 1 & 2)

A two-roll calender (cf. FIG. 1) is especially suitable for producing adhesive tapes having layer thicknesses of between 5 μm and 5000 μm at low and moderate coating speeds of 1 m/min to 50 m/min.

The two rolls (W1) and (W2) are arranged so that they form a gap, or nip, into which the self-adhesive composition (3) is introduced by means for example of a distributor nozzle (1). The first roll (BW) ["coating roll"] guides the temporary carrier (2) onto which the self-adhesive composition (3) is to be coated. The second roll (RW) ["doctor roll"] guides an antiadhesively furnished auxiliary carrier (5) and by means of the auxiliary carrier presses onto the adhesive, so that the latter is deposited as a layer (4) on the temporary carrier (2). At position (6) the antiadhesively furnished auxiliary carrier (5) is taken off again by the layer (4) of self-adhesive composition. The adhesive tape (6), composed of the layer (4) of adhesive on the temporary carrier (2), is guided out of the coating unit.

At layer thicknesses up to about 500 μm there is no need for the antiadhesively furnished auxiliary carrier (5), and so the adhesive (3) has direct contact with the doctor roll (RW).

As materials for the temporary carrier (2) it is possible to use virtually all of the carrier materials that are known in adhesive tape manufacture, as for example thermoplastic films of PE, PP, PET, papers, wovens, and also release films and other antiadhesive furnished carrier types. The surface temperatures of the rolls are set at between 25° C. and 200° C., preferably between 60° C. and 150° C., and more preferably between 80° C. and 120° C. Suitable surfaces for the two calender rolls used are the materials familiar to the skilled worker, such as steel, chromium-plated steel, stainless steel, plastics, silicones, ceramics, and conceivable combinations of the stated materials.

If layer thicknesses up to about 500 μm are to be coated and if no auxiliary carrier (5) is used, an antiadhesively furnished surface to the doctor roll (RW) is advantageous. A roll surface of this kind may be composed, for example, of the material designated PALLAS SK-B-012/5 from PALLAS OBERFLÄCHENTECHNIK GMBH, Germany, or of the material designated AST 9984-B from ADVANCED SURFACE TECHNOLOGIES, Germany. These surfaces are metal-ceramic-silicone composites, which are distinguished by good antiadhesive properties in conjunction with a high service life under the chosen operating conditions.

Version B: Three-Roll Calender (FIG. 3)

Figure 2:
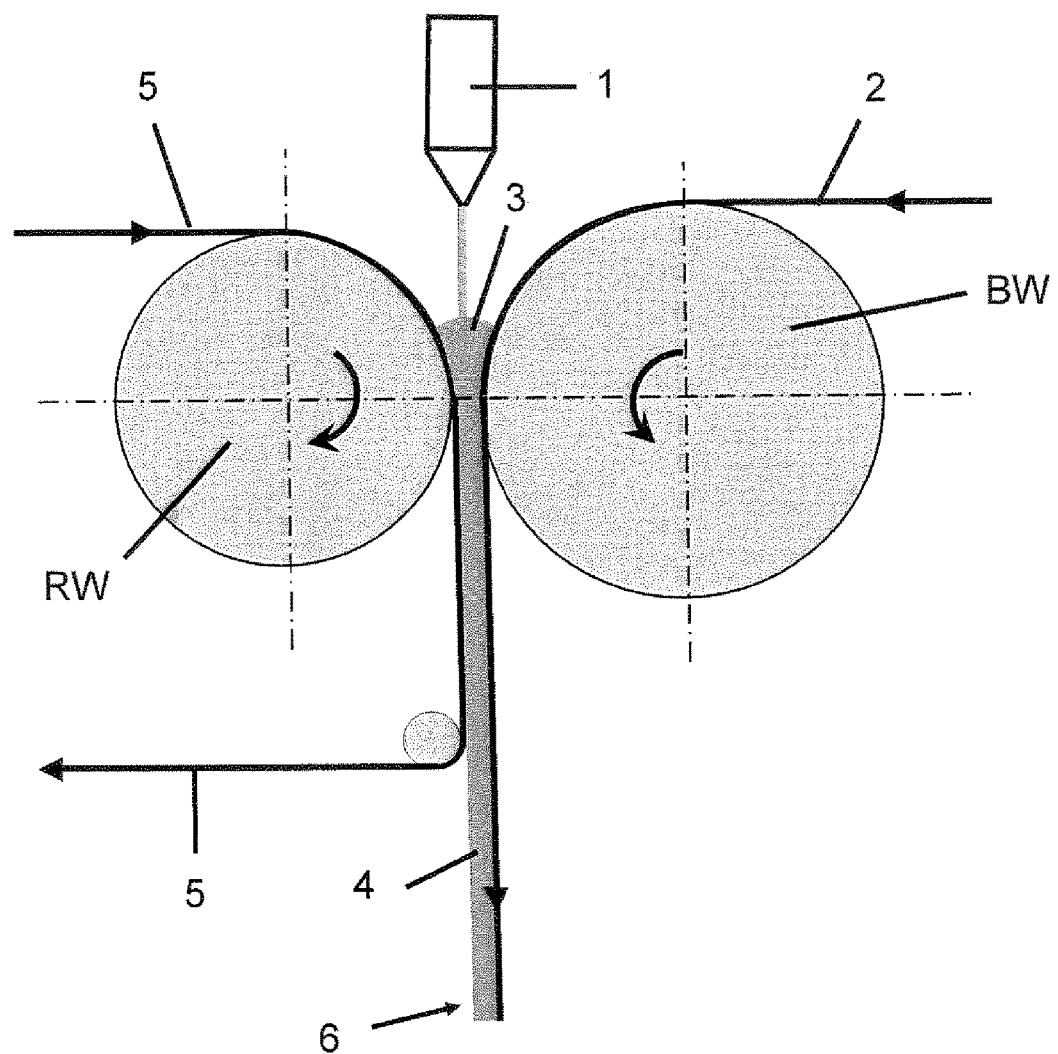
FIG. 2 is a detailed view of a two-roll calender.

With great advantage it is possible to use multiroll systems for coating. FIG. 2 shows the principle of the three-roll applicator: a distributor nozzle (1) applies the adhesive (3) again into a nip formed by a first roll (ÜW) ["transfer roll"] and a doctor roll (RW). The self-adhesive composition is deposited temporarily on the transfer roll (ÜW) and guided by that roll to a third roll (FW) ["guide roll"] which brings the temporary carrier material (2) to the layer of adhesive. In the course of passage through the nip formed between the transfer roll (ÜW) and the guide roll (FW), the layer (4) of adhesive is deposited from the surface of the transfer roll (ÜW) onto the temporary carrier material (2) and in the form of adhesive tape (6) is guided out of the coating unit.

The rotational direction of the individual rolls is depicted in the figure by the respective arrow direction.

Entirely surprising to the skilled worker is the fact that the polyacrylate-based, solvent-free self-adhesive compositions which are blended with tackifier resin and in some cases have a strong inherent tack can be coated by means of three-roll calenders, and amazingly can even be coated onto antiadhesively furnished carrier materials such as release papers and release films. What would have been expected instead was that the adhesive, after leaving the distributor nozzle, would remain at least partly on the doctor roll (FW) and would not be transferred as a homogeneous film of self-adhesive composition onto the transfer roll (ÜW). Moreover, it would not have been supposed that the self-adhesive composition shaped on transfer roll (ÜW) would be able to be transferred with a largely optically homogeneous coating pattern onto the carrier material. Instead, the expectation would have been that the film of adhesive would remain on the transfer roll (ÜW) or would be transferred incompletely to the carrier. Amazingly, instead, adhesive tapes with a good coating pattern, i.e., with a largely optically homogeneous surface, are produced.

Particularly good results are achieved through the use of calender rolls which have been furnished with antiadhesive surfaces. Different kinds of antiadhesive surface coatings can be used with the calender rolls. Those having proven particularly suitable in this context include, for example, the aforementioned metal-ceramic-silicone composite materials PALLAS SK-B-012/5 from PALLAS OBERFLÄCHENTECHNIK GMBH, Germany, and AST 9984-B from ADVANCED SURFACE TECHNOLOGIES, Germany.

Owing to the high pressures occurring in the roll nips, and also, where appropriate, differential speeds of the rolls relative to one another, pure silicone coatings or TEFLON® coatings appear to be of only limited suitability, since either they are mechanically destroyed and/or they lose their antiadhesive properties over time.

With the 3-roll coating calender described it is possible in particular to carry out coating of self-adhesive compositions with layer thicknesses between 5 μm and 300 μm onto carrier materials, preferably with layer thicknesses between 20 μm and 250 μm, and more preferably with layer thicknesses between 50 μm and 200 μm.

The coating speed—what is meant here is the peripheral speed of the guide roll (FW), which therefore corresponds to the web speed of the carrier material—can be set advantageously between 1 m/min and 400 m/min, preferably between 10 m/min and 300 m/min. The peripheral speed of the transfer roll (ÜW) can be set advantageously at 5% to 110% of the web speed, preferably at 50% to 110% of the web speed, and more preferably at 80% to 110% of the web speed. The peripheral speed of the doctor roll (RW) can be set advantageously at 0 m/min ("static tensioning") up to 5% of the web speed. As well as the peripheral speeds of the rolls, the roll nips can also be set. What are meant here are the distances between the doctor roll (RW) and the transfer roll (W2), and between the transfer roll (W1) and the guide roll (FW).

The roll nips are preferably set such that the layer thicknesses described above are attained at the roll surface speeds described above.

The roll surface temperatures are set advantageously at 40° C. to 160° C., preferably at 60° C. to 140° C., and more preferably at 80° C. to 120° C. In this context it is possible for all three rolls of the calender to be set at the same temperature, although it is also possible to set different surface temperatures for each roll. The roll surface temperatures must be adapted in each case to the nature of the roll surfaces, the adhesive to be applied by coating, and the carriers to be coated.

There follows by way of example an overview of suitable roll surfaces which have proven particularly advantageous:

Doctor Roll (RW)
  SK-B-012/5 from PALLAS OBERFLÄCHENTECHNIK GmbH, Germany
  AST 9984-B from ADVANCED SURFACE TECHNOLOGIES, Germany
  Chromium-plated steel
  Steel, surface roughness RZ 10 to RZ 35
  TEFLON®
  Silicone Transfer Roll (ÜW)
  SK-B-0125/5 from PALLAS OBERFLÄCHENTECHNIK GmbH, Germany
  AST 9984-B from ADVANCED SURFACE TECHNOLOGIES, Germany Guide Roll (FW)
  Silicone rubber, 60 to 80 shore Version C: Four-Roll Calender (Co-/Co-Rotation) (cf. FIG. 4)

FIG. 3 shows a further favorable coating unit. Starting from the unit described above, a second transfer roll (Ü2W) is provided between the first transfer roll (Ü1W) and the guide roll (FW). In the nip between the first transfer roll (Ü1W) and the second transfer roll (Ü2W) the layer (4) of adhesive is taken from the first transfer roll (Ü1W) and applied to the second transfer roll (Ü2W). From this second transfer roll the layer (4) of adhesive is again transferred to the carrier material, in the same way as already described for the three-roll applicator.

The rolls are connected in co-/co-rotation; compare the rotational directions of the individual rolls as indicated by arrows.

With the four-roll coating calender described (co-/co-rotational operation) it is possible—as with the three-roll process described as version B—with great advantage to coat self-adhesive compositions with layer thicknesses between 5 µm and 300 µm onto carrier materials, preferably with layer thicknesses between 20 µm and 250 µm, and more preferably with layer thicknesses between 50 µm and 200 µm. This calender configuration can be chosen with particular preference in particular when adhesives of high viscosity are to be applied by coating or when the finished adhesive tape is required to have a particularly smooth surface structure.

The coating speed (again in the sense of the peripheral speed of the guide roll (FW) and of the web speed) can be set advantageously between 0.5 m/min and 400 m/min, preferably between 10 m/min and 300 m/min.

The peripheral speed of the doctor roll (RW) can be set here as well advantageously at 0 m/min up to 5% of the web speed.

The peripheral speed of the first transfer roll (Ü1W) can be set preferably at 5% to 80% of the web speed, more preferably at 10% to 50% of the web speed, and with particular preference at 20% to 30% of the web speed.

The peripheral speed of the second transfer roll (Ü2W) can be set preferably at 10% to 110% of the web speed, more preferably at 50% to 110% of the web speed, and with particular preference at 80% to 110% of the web speed.

The roll nips (in each case between rolls AW and Ü1W, Ü1W and Ü2W, and Ü2W and FW) are again preferably set such that the layer thicknesses described above are attained at the roll surface speeds described above.

The roll surface temperatures are set advantageously at 40° C. to 160° C., preferably at 60° C. to 140° C., and more preferably at 80° C. to 120° C. All four rolls of the calender can be set at the same temperature, although it is also possible to set different surface temperatures for each roll. The roll surface temperatures should be adapted in each case to the nature of the roll surfaces, the adhesive that is be applied by coating, and the carriers to be coated.

Here again there is an overview of the roll surfaces which can be used with particular advantage in accordance with the invention, without any intention that this indication should subject the invention to any unnecessary restriction:
Doctor Roll (RW)
  SK-B-012/5 from PALLAS OBERFLÄCHENTECHNIK GmbH, Germany
  AST 9984-B from ADVANCED SURFACE TECHNOLOGIES, Germany
  Chromium-plated steel
  Steel, surface roughness RZ 10 to RZ 35
  TEFLON®
  Silicone
First Transfer Roll (Ü1W)
  AST 9984-B from ADVANCED SURFACE TECHNOLOGIES, Germany
Second Transfer Roll (Ü2W)
  SK-B-012/5 from PALLAS OBERFLÄCHENTECHNIK GmbH, Germany
Guide Roll
  Silicone rubber, 60 to 80 shore
Method 4D: Four-Roll Calender (Co-/Counter-Rotation) (cf. FIG. 5)

FIG. 4 shows a likewise advantageously employable four-roll calender which is operated, however, in co-/counter-rotation. In its operation, version D differs from version C in that the layer of adhesive is not pulled through between the transfer rolls Ü1W and Ü2W and in the course of that operation transferred from the first transfer roll Ü1W to the second transfer roll Ü2G, but instead, as a result of the first and second transfer rolls having the same rotational direction, the adhesive undergoes a change of direction (counter-rotation) as it passes from the first to the second transfer roll; cf. in this respect the depiction in FIG. 4 and in particular the rotational directions of the rolls as shown therein.

With the four-roll coating calender described here it is possible, as with the four-roll calender configuration described in method C, to carry out outstanding coating of self-adhesive compositions. This calender configuration is notable for the fact that the second transfer roll Ü2W has a direction of rotation, at the roll nip between these two rolls, that is opposite to that of the first transfer roll Ü1W. As a result it is possible to produce adhesive tapes with high layer thicknesses of between 100 µm and 1000 µm, preferably with layer thicknesses between 200 µm and 800 µm, and more preferably with layer thicknesses between 300 µm and 600 µm.

The coating speed, which again is the peripheral speed of the guide roll FW, can be set advantageously between 0.5 m/min and 400 m/min, preferably between 10 m/min and 300 m/min.

The peripheral speed of the doctor roll AW can be set advantageously at 0 m/min up to 5% of the web speed.

The peripheral speed of the first transfer roll Ü1W can be set advantageously at 5% to 130% of the web speed, preferably at 10% to 50% of the web speed, and more preferably at 20% to 30% of the web speed.

The peripheral speed of the second transfer roll Ü2W can be set advantageously at 10% to 110% of the web speed, preferably at 50% to 110% of the web speed, and more preferably at 80% to 110% of the web speed.

With this version as well the roll nips are set so as to achieve the above-described layer thicknesses at the above-described roll surface speeds.

In accordance with the invention the roll surface temperatures are set advantageously at 40° C. to 160° C., preferably at 60° C. to 140° C., and more preferably at 80° C. to 120° C. All four rolls of the calender can be set at the same temperature, although it is also possible to set different surface temperatures for each roll. The roll surface temperatures should be adapted in each case to the nature of the roll surfaces, the adhesive that is be applied by coating, and the carriers to be coated.

For this version D, likewise, an overview of the roll surfaces employed is given, without wishing to subject the inventive subject matter to any unnecessary restriction:
Doctor Roll AW
  SK-B-012/5 from PALLAS OBERFLÄCHENTECHNIK GmbH, Germany
  AST 9984-B from ADVANCED SURFACE TECHNOLOGIES, Germany
  Chromium-plated steel
  Steel, surface roughness RZ 10 to RZ 35
  TEFLON®
  Silicone
Transfer Roll Ü1W
  AST 9984-B from ADVANCED SURFACE TECHNOLOGIES, Germany
Transfer roll Ü2W
  SK-B-012/5 from PALLAS OBERFLÄCHENTECHNIK GmbH, Germany
Guide Roll FW
  Silicone rubber, 60 to 80 shore Directly after the operation of coating by means of roll application, in particular in one of the aforementioned versions, or by means of an extrusion die, the adhesive is only slightly, partially crosslinked, but not yet sufficiently crosslinked. Coating in this context means the shaping of the very substantially solvent-free adhesive, blended with crosslinker, into thin layers, and its application to a temporary carrier material in web form. The processing time is 3-30 minutes, preferably 5-20 minutes, more preferably 5-10 minutes. Low-viscosity systems are coated preferably using nozzles, their higher-viscosity counterparts using two-roll mechanisms or multiroll mechanisms.

The crosslinking reaction proceeds advantageously on the temporary carrier. The reaction, particularly with isocyanates, proceeds preferably without catalysis. The crosslinking reaction proceeds completely, even without supply of heat, under normal conditions (room temperature). In general the crosslinking reaction with the multifunctionalized isocyanate is very largely at an end, and the ultimate cohesion of the composition is attained, after a storage period of up to 14 days, in particular of four to ten days.

Crosslinking with isocyanates forms urethane groups, which link the polymer chains. As a result of the linkage, there is an increase in the cohesion of the adhesive and hence also in the shear strength. These groups are known to be very stable. This allows self-adhesive tapes which possess great aging stability and heat resistance.

The physical properties of the end product, particularly its viscosity, bond strength, and tack, can be influenced by the degree of crosslinking, thereby allowing the end product to be optimized through an appropriate choice of the reaction conditions.

Various factors determine the operational window of this process. The most important influencing variables are operational temperature and coating temperature, residence time in the compounding extruder and coating assembly, type of crosslinker (deactivated, aliphatic, aromatic), crosslinker concentration, fraction of hydroxyl groups in the polymer, fraction of copolymerized acid groups in the polymer, and the average molecular weight of the polyacrylate.

A number of relations are described below with regard to the preparation of the self-adhesive composition of the invention, these relations optimizing the production method but not being restrictive of the concept of the invention:

For a given concentration of crosslinker, an increase in the operating temperature leads to a reduced viscosity, which enhances the coatability of the composition but reduces the processing time. An increase in processing time is obtained by lowering the crosslinker concentration, lowering the molecular weight, lowering the concentration of hydroxyl groups in the polymer, lowering the acid fraction in the polymer, using less reactive isocyanates, and lowering the operating temperature. An improvement in the cohesion of the composition can be obtained in different ways. One way is to raise the crosslinker concentration, which reduces the processing time. With the crosslinker concentration constant, it is also possible to raise the molecular weight of the polyacrylate, which is possibly more efficient. The above-mentioned parameters must be adapted appropriately in accordance with the desired profile of requirements of the composition and/or the product.

To line the PSA layer of the single-coat self-adhesive tape it is advantageously laminated to the release materials (liners) which are common knowledge. Suitable liners are single-sidedly or double-sidedly siliconized polyester films, on account of the particularly smooth surfaces they make possible.

For certain applications the adhesive tape of the invention, in this case in the form of an intermediate product, can be improved or further adapted to requirements by means of additional irradiation with actinic radiation (UV light or electron beams, for example).

The invention provides in particular for the use of the self-adhesive tape as described above, or of the self-adhesive tape produced as described above, as an adhesive transfer tape.

EXAMPLES

The exemplary experiments which follow are intended to illustrate the invention, without the choice of the examples given being intended to restrict the invention unnecessarily.
Test Methods:
Solids Content:

The solids content is a measure of the fraction of non-volatiles in a polymer solution. It is determined gravimetrically by weighing the solution, then evaporating the volatile fractions in a drying cabinet at 120° C. for 2 hours, and weighing the residue again.
K Value (According to FIKENTSCHER):

The K value is a measure of the average size of molecules of high-polymer compounds. It is measured by preparing one percent (1 g to 100 ml) toluene solutions of polymer and determining their kinematic viscosities using a VOGEL-OSSAG viscometer. Standardizing to the viscosity of the toluene gives the relative viscosity, from which the K value can be calculated by the method of FIKENTSCHER (Polymer 8/1967, 381 ff.).
Gel Permeation Chromatography GPC The average molecular weight $M_w$ and the polydispersity PD were determined by the company Polymer Standards Service at Mainz. The eluent used was THF containing 0.1% by volume trifluoroacetic acid. Measurement was made at 25° C. The precolumn used was of type PSS-SDV, 5μ, $10^3$ Å, ID 8.00 mm×50 mm. Separation was carried out using the columns of type PSS-SDV, 5μ, $10^3$ and also $10^5$ and $10^6$ each of ID 8.0 mm×300 mm. The sample concentration was 4 g/l and the flow rate 1.0 ml per minute. Measurement was made against PMMA standards.
90° Bond Strength to Steel (Open and Lined Sides)

The bond strength to steel is determined under test conditions of 23° C.+/−1° C. room temperature and 50%+/−5% relative atmospheric humidity. The specimens were cut to a width of 20 mm and adhered to a steel plate. Prior to the measurement, the steel plate must be cleaned and conditioned. For that purpose the plate is first wiped with acetone and then left in the air for 5 minutes to allow the solvent to evaporate. The side of the transfer tape facing away from the test substrate was then lined with a 50 μm aluminum foil, to prevent the specimen stretching in the course of measurement. After that, the test specimen was rolled onto the steel substrate. For that purpose the tape was run over back and forth with a 2 kg roller 5 times, at a rolling speed of 10 m/min. Immediately after this rolling, the steel plate was inserted into a special mount which allows the specimen to be peeled vertically upward at an angle of 90° C. The bond strength was measured using a Zwick tensile testing machine. In the case of application of the lined side to the steel plate, the open side of the transfer tape is first laminated against the 50 μm aluminum foil, the release material is removed and the tape is adhered to the steel plate, rolled on in the same way and subjected to measurement.

The results measured for both sides, open and lined, are reported in N/cm and have been averaged from three measurements.
Holding Power (Open and Lined Sides)

Sample preparation took place under test conditions of 23° C.+/−1° C. room temperature and 50%+/−5% relative atmospheric humidity. The test specimen was cut to 13 mm and adhered to a steel plate. The bond area is 20 mm×13 mm (length×width). Prior to the measurement, the steel plate was cleaned and conditioned. For that purpose the plate is first wiped with acetone and then left in the air for 5 minutes to allow the solvent to evaporate. After bonding, the open side was reinforced with a 50 μm aluminum foil and rolled over twice back and forth with a 2 kg roller. Then a belt loop was attached to the protruding end of the transfer tape. The whole assembly was then suspended from a suitable apparatus and loaded with 10 N. The suspension apparatus is such that the weight loads the sample at an angle of 179°+/−1°. This ensures that the transfer tape cannot peel from the bottom edge of the plate. The measured shear withstand time, the time between suspension of the specimen and its falling off, is reported as holding power in minutes and corresponds to the average value from three measurements. For the measurement of the lined side, the open side is first reinforced with the 50 μm aluminum foil, the release material is removed, and the tape is adhered to the test plate in the same way as described. The measurement is made under standard conditions (23° C., 55% atmospheric humidity).

Rolling Ball Tack (Open and Lined Sides)

The rolling ball test was used to measure the tack of the specimens with a very short contact time. Measurement took place under test conditions of 23° C.+/−1° C. room temperature and 50%+/−5% relative atmospheric humidity. The transfer tape was fixed, with the side under test facing upward, under gentle tension, on the working plate, which was oriented exactly horizontally. Subsequently a ramp 65 mm high was placed on the specimen strip and a clean steel ball (diameter 11 mm), cleaned with acetone and weighing 5.6 g, was rolled down the ramp. The distance between the leading edge of the ramp and the center point of the rolled ball which has come to rest was measured. The value reported is the average from 5 measurements per side.

SAFT—Shear Adhesive Failure Temperature

The SAFT test is an accelerated test of the short-term temperature resistance of the transfer tapes. The specimens were reinforced with a 50 μm aluminum foil and the remaining adhesive side was adhered to a ground steel test plate which had been cleaned with acetone, and then over-rolled six times using a 2 kg steel roller at a speed of 10 m/min. The bond area of the sample, height×width, was 13 mm×10 mm. The top part of the specimen, which protrudes beyond the test plate by 2 mm, was reinforced with a shear adhesive strip. At this point, after the sample had been suspended vertically, the travel sensor was applied.

The sample under measurement was loaded at the bottom end with a weight of 50 g. The steel test plate with the bonded sample was then heated, starting at 25° C. and at a rate of 9° C. per minute, to the final temperature of 200° C. Using the travel sensor, the slip travel of the sample was measured as a function of temperature and time. The measurement was ended when the envisaged final temperature was reached or when a slip travel of >1000 μm was attained.

The SAFT test is able to provide two test features: SAFT shear travel or SAFT short-term temperature resistance. The SAFT shear travel is the slip travel in μm when the final temperature is reached. The SAFT short-term temperature resistance is the temperature at which a slip travel of 1000 μm is attained. Both sides of the transfer tape are measured: the open side and the lined side. The value reported is in each case the average of a duplicate determination.

Preparation of the Starting Polymers for Examples T1 to T7

The preparation of the starting polymers is described below. The polymers investigated are prepared conventionally via free radical polymerization in solution.

HEMA=hydroxyethyl methacrylate
AIBN=2,2'-azobis(2-methylbutyronitrile)
Perkadox 16=bis(4-tert-butylcyclohexyl) peroxydicarbonate Base Polymer B1

A reactor conventional for free-radical polymerizations was charged with 27 kg of 2-ethylhexyl acrylate, 27 kg of n-butyl acrylate, 4.8 kg of methyl acrylate, 0.6 kg of acrylic acid, 0.6 kg of HEMA and 40 kg of acetone/isopropanol (93:7). After nitrogen gas had been passed through the reactor for 45 minutes with stirring, the reactor was heated to 58° C. and 30 g of AIBN were added. Subsequently the external heating bath was heated to 75° C. and the reaction was carried out constantly at this external temperature. After 1 h a further 30 g of AIBN were added and after 4 h the batch was diluted with 10 kg of acetone/isopropanol mixture.

After 5 h and after 7 h, reinitiation was carried out with 90 g of Perkadox 16 each time. After a reaction time of 22 h the polymerization was discontinued and the product was cooled to room temperature. The polyacrylate has a K value of 69, a solids content of 54.6%, an average molecular weight of Mw=810 000 g/mol, and a polydispersity (Mw/Mn)=7.6.

Base Polymer B2

In the same way as for example 1, 40.2 kg of 2-ethylhexyl acrylate, 18.0 kg of tert-butyl acrylate, 1.2 kg of acrylic acid and 0.6 kg of HEMA were polymerized in 40 kg of acetone/isopropanol (93:7). Initiation was carried out twice with 30 g of AIBN each time, twice with 90 g of Perkadox 16 each time, and dilution was carried out with 10 kg of acetone/isopropanol mixture (93:7). After a reaction time of 22 h the polymerization was discontinued and the product was cooled to room temperature.

The polyacrylate has a K value of 63, a solids content of 54.8%, an average molecular weight of Mw=653 000 g/mol, and a polydispersity (Mw/Mn)=7.8.

Base Polymer B3

In the same way as for example 1, 36.0 kg of 2-ethylhexyl acrylate, 21.0 kg of tert-butyl acrylate, 2.4 kg of acrylic acid and 0.6 kg of HEMA were polymerized in 40 kg of acetone/isopropanol (93:7). Initiation was carried out twice with 30 g of AIBN each time, twice with 90 g of Perkadox 16 each time, and dilution was carried out with 10 kg of acetone/isopropanol mixture (93:7). After a reaction time of 22 h the polymerization was discontinued and the product was cooled to room temperature.

The polyacrylate has a K value of 60.0, a solids content of 53.5%, an average molecular weight of Mw=602 000 g/mol, and a polydispersity (Mw/Mn)=7.1.

Method 1: Concentration/Preparation of Hotmelt PSAs:

The acrylate copolymers (base polymer B1-B3) functionalized with hydroxyl groups are freed very largely from the solvent by means of a BERSTORFF single-screw extruder (concentrating extruder). The parameters given by way of example here are those for the concentration of base polymer B1. The rotational speed of the screw was 170 rpm, the motor current 17 A, and a throughput of 62.3 kg liquid/h was realized. For concentration, a vacuum was applied at 3 different domes. The reduced pressures were, respectively, 340 mbar, 50 mbar and 7 mbar, the lowest vacuum being applied in the first dome. The exit temperature of the concentrated hotmelt was 105° C. The solids content after this concentration step was 99.7%.

Method 2: Preparation of Resin-Modified Hotmelt PSAs (Example T7)

The pressure-sensitive acrylate hotmelt adhesives produced by method 1, elucidated above, from base polymer B1 were conveyed directly into a downstream WELDING twin-screw extruder (WELDING Engineers, Orlando, USA; Model 30 MM DWD; screw diameter 30 mm, length of screw 1=1258 mm; length of screw 2=1081 mm; 3 zones). Using a solids metering system, 20% by weight of the resin Dertophene T110 (manufacturer DRT, France) was metered in zone 1 and mixed in homogeneously. The rotational speed was 454 rpm, the motor current 42 A, and a throughput of 29.5 kg/h was realized. The temperatures of zones 1 and 2 were each 100° C., the melting temperature in zone 1 was 112° C., and the temperature of the composition on exit (zone 3) was 90° C.

Method 3: Preparation of the Filler-Modified PSAs, Blending with the Thermal Crosslinker The pressure-sensitive acrylate hotmelt adhesives produced by methods 1 and 2 were melted in a feeder extruder (single-screw conveying extruder from TROESTER) and using this extruder were conveyed as a polymer melt into a twin-screw extruder (LEISTRITZ, Germany, ref. LSM 30/34). The assembly is heated electrically from the outside and is air cooled by a number of fans. The geometry of the mixing screws was chosen such that effective distribution of the fillers, where appropriate, and of the crosslinking system in the polymer matrix is accompanied by the assurance of a short residence time of the adhesive in the extruder. For these purposes the mixing screws of the twin-screw extruder were arranged so that conveying elements are in alternation with mixing elements. The addition of the fillers and of the respective crosslinking system takes place with appropriate metering equipment, at two or more sites where appropriate, into the unpressurized conveying zones of the twin-screw extruder. Metering aids are used where appropriate to meter the crosslinking system. It is possible if desired to connect a vacuum pump to the twin-screw extruder in order to free the compounded self-adhesive composition from gas inclusions. The ready-compounded adhesive is then supplied, by means of a melt pump downstream of the mixing extruder, to a distributor nozzle, which conveys the adhesive into the first roll nip.

The coating operation of the self-adhesive compositions of the invention to form a transfer tape takes place preferably by the methods described below.

Further Methods of Producing the Self-Stick Adhesives of the Invention

In addition it is possible to combine methods 2 and 3, so that the resin and the fillers described are incorporated jointly into the polymer matrix.

As mentioned earlier on above, the time between the metered addition of the crosslinking system through the optically homogeneous shaping onto a carrier or between two carriers is referred to as the processing time. The processing time is heavily dependent on operating temperature, roll surface temperatures, type and amount of crosslinker, and also on the functionalization of the acrylate composition with carboxyl and hydroxyl groups, and indicates the period of time within which the crosslinker-blended adhesive can be coated with an optically good appearance (gel-free, speck-free).

Method 4: Production of the Inventive Adhesive Transfer Tapes by Means of Two-Roll Applicator Operation takes place in accordance with a method corresponding to version A (cf. FIG. 2).

After the ready-compounded, crosslinker-blended adhesive has exited the twin-screw extruder (outlet: circular nozzle, 5 mm diameter), it is coated directly by means of a downstream two-roll applicator between two siliconized release films (temporary carrier, siliconized on both sides; and antiadhesive auxiliary carrier, siliconized on at least one side), preferably polyester films. Following lamination of the films and before the tapes are wound, one of the two siliconized release films (auxiliary carriers) is lined.

The siliconization of the temporary carrier is advantageously chosen such that, after being wound above, the adhesive tape can be unwound again without problems and without transfer to the overlying layer. The siliconization of the auxiliary carrier is preferably chosen such that it releases more strongly than the siliconization of the temporary carrier.

As mentioned earlier on above, the time between the metered addition of the crosslinking system through the optically homogeneous shaping onto a carrier is referred to as the processing time. The processing time is heavily dependent on operating temperature, type and amount of crosslinker, and also on the functionalization of the acrylate composition with carboxyl and hydroxyl groups, and indicates the period of time within which the crosslinker-blended adhesive can be coated with an optically good appearance (gel-free, speck-free). Coating takes place with a web speed of 40 m/min.

In the examples below and in table 1 the operating conditions, metering proportions and formulations are elucidated in greater detail.

Example 1 (T1)

The base polymer 1 was concentrated by method 1 (solids content 99.7%) and then blended by method 1 with 0.21% by weight (based on acrylate copolymer) of the hydrophilic, aliphatic polyisocyanate Bayhydur VP LS 2150/1 (BAYER AG, Germany). To improve its capacity for being metered, it was diluted 1:3 with the liquid phosphate ester REOFOS 65 (GREAT LAKES, USA). The operating parameters are summarized in table 1. The processing time of the compound was 9 minutes at an effective composition temperature of 108° C. after leaving the LEISTRITZ extruder. Coating takes place on a two-roll applicator at roll temperatures of 100° C. with a coatweight of 730 g/m$^2$ onto a double-sidedly siliconized 50 μm polyester film by method 4.

After 7 days' room-temperature storage, technical adhesive measurements were carried out on the adhesive tape produced in this way, on both the open and the lined sides of the adhesive transfer film. The technical adhesive data of example T1 are summarized in table 2.

Example 2 (T2)

The base polymer B1 concentrated by method 1 and polyacrylate blended by method 3 with 6.5% by weight of hollow glass beads Q-CEL 5028 (Pollers Industries) and 2.13% by weight of Bayhydur VP LS 2150/1 was coated by method 4 with a coatweight of 625 g/m$^2$ onto a double-sidedly siliconized 50 μm polyester film.

After 7 days' room-temperature storage, technical adhesive measurements were carried out on the adhesive tape produced in this way, on both the open and the lined sides of the adhesive transfer film. The technical adhesive data of example T2 are summarized in table 2.

Example 3 (T3)

The base polymer B2 concentrated by method 1 and blended by method 3 with 6.5% by weight of hollow glass beads Q-CEL 5028 and 0.11% by weight of Bayhydur VP LS 2150/1 was subsequently coated by method 4 with a coatweight of 705 g/m² onto a double-sidedly siliconized polyester film.

After 7 days' room-temperature storage, technical adhesive measurements were carried out on the adhesive tape produced in this way, on both the open and the lined sides of the adhesive transfer film. The technical adhesive data of example T3 are summarized in table 2.

Example 4 (T4)

In the same way as in example T1, the concentrated base polymer B2 with 0.83% by weight of the aliphatic, IPDI-based polyisocyanate trimer Tolonate XIDT 70B (Rhodia) was blended and coated by method 4 with a coatweight of 775 g/m².

The measurements carried out after 7 days' room-temperature storage on both the open and the lined sides of the adhesive transfer film T4 are summarized in table 2.

Example 5 (T5)

In the same way as in example T3, the concentrated base polymer B2 with 6.5% by weight of hollow glass beads Q-CEL 5028 and 0.14% by weight of Tolonate XIDT 70B was blended and then coated onto a double-sidedly siliconized 50 µm polyester film with a coatweight of 590 g/m².

The measurements carried out after 7 days' room-temperature storage on both the open and the lined sides of the adhesive transfer film T5 are summarized in table 2.

Example 6 (T6)

In the same way as in example T1, the base polymer B3, concentrated by method 1, was blended with 0.25% by weight (based on acrylate copolymer) of the hydrophilic, aliphatic polyisocyanate Bayhydur VP LS 2150/1 (Bayer Ag, Germany). Subsequently the blend was coated with a coatweight of 600 g/m² onto double-sidedly siliconized polyester film by method 4.

The technical adhesive data determined after 7 days' room-temperature storage on both the open and the lined sides of the adhesive transfer film T6 are summarized in table 2.

Example 7 (T7)

In the same way as in example 1, the base polymer 1 was concentrated by method 1, and blended by method 2 with 20% by weight of resin DT 110 (DRT), then blended by method 3 with 0.11% by weight of Bayhydur VP LS 2150/1, and coated with a coatweight of 750 g/m² onto siliconized polyester films.

The technical adhesive data determined after 7 days' room-temperature storage on the open and the lined sides of the adhesive transfer film of example T7 are summarized in table 2.

Completely surprising for the skilled worker is the coatability of the hotmelt composition following the addition and incorporation by mixing of the isocyanate crosslinking system into the polyacrylate adhesive at the temperatures of between 60° C. and 120° C., preferably between 70° C. and 100° C., prevailing within the compounding assembly. By coatability is meant in this context the capacity for the shaping of the crosslinker-blended adhesive into thin layers and for its application to a (temporary) carrier material in web form by means of a coating nozzle or roll coating mechanism.

What was to have been expected was a crosslinking or gelling of the adhesive, so that subsequent application by coating would no longer have been possible. In actual fact, however, the adhesives described can be applied by coating within a certain time period after the metered addition of crosslinker and after compounding. The processing time is heavily dependent on molecular weight and hydroxyl functionalization of the polyacrylate adhesive, and also on the type and amount of the crosslinking system used and on the prevailing operating conditions, such as composition temperature and geometry of the compounding assembly, for example.

In accordance with the known prior art, the skilled worker would have expected an immediate reaction of the isocyanates with the OH groups present in the polyacrylate, thereby making the partially crosslinked composition uncoatable. To avoid this, he or she would have had to use blocked isocyanates at extremely high temperatures, with the disadvantage of the blocking agents remaining in the adhesive and causing disruption.

As is apparent from the data in table 2, it is possible by this method to produce very high-performing adhesive transfer tapes. The adhesion values are very good, particularly in the case of resin modification, and the cohesion—measured via the holding power at 23° C.—is likewise good. Surprisingly good for the skilled worker is the heat resistance as measured by the SAFT test. In every case the bond is stable up to a temperature of 200° C.

Particularly positive is the balanced adhesive profile of the respective sides of the adhesive transfer tape. When coating is carried out onto a double-sidedly siliconized smooth PET film, both sides of the adhesive transfer tape exhibit virtually the same technical adhesive data. This illustrates the homogeneous crosslinking through the layer. This is surprising for the skilled worker.

The method of the invention makes it possible for the first time to avoid the disadvantages of the prior art.

TABLE 1

| | | | | Crosslinker incorporation and coating | | | | |
|---|---|---|---|---|---|---|---|---|
| | Base polymer | | Fraction of | Crosslinker type and amount [% cross- | Throughput of composition | Rotational speed of | Setpoint temperature | Current consumption |
| Example | Polymer | K value | additives [% by weight] | linker to polymer] | through TSE [kg/h] | TSE [1/min] | of TSE [° C.] | of TSE [A] |
| T1 | B2 | 63 | — | 0.21% Bayhydur VP LS 2150/1 | 10 | 100 | 80 | 16 |

TABLE 1-continued

| | | | | | | | | |
|---|---|---|---|---|---|---|---|---|
| T2 | B1 | 69 | 6.5% Hollow glass beads Q-CEL 5028 | 2.13% Bayhydur VP LS 2150/1 | 11 | 100 | 80 | 11 |
| T3 | B2 | 63 | 6.5% Hollow glass beads Q-CEL 5028 | 0.11% Bayhydur VP LS 2150/1 | 11 | 150 | 80 | 18 |
| T4 | B2 | 63 | — | 0.83% Tolonate XIDT 70B | 10 | 100 | 80 | 15 |
| T5 | B2 | 63 | 6.5% Hollow glass beads Q-CEL 5028 | 0.14% Tolonate XIDT 70B | 11 | 100 | 80 | 18 |
| T6 | B3 | 60 | — | 0.25% Bayhydur VP LS 2150/1 | 12 | 100 | 80 | 15 |
| T7 | B1 | 69 | 20% DT 110 | 0.25% Bayhydur VP LS 2150/1 | 10 | 100 | 80 | 14 |

| | Crosslinker incorporation and coating | | | | | |
|---|---|---|---|---|---|---|
| Example | Pressure at exit of TSE [bar] | Temperature of composition after TSE [° C.] | Coating temperature of doctor roll/coating roll [° C.] | Processing time [min] | Coat-weight [g/m$^2$] | Layer thickness [μm] |
| T1 | 24 | 108 | 100/100 | 9 | 730 | 770 |
| T2 | 15 | 98 | 100/100 | 4 | 625 | 715 |
| T3 | 38 | 130 | 120/120 | 7 | 705 | 720 |
| T4 | 32 | 106 | 100/100 | 4 | 775 | 785 |
| T5 | 30 | 104 | 100/100 | 5 | 590 | 625 |
| T6 | 32 | 115 | 100/100 | 10 | 600 | 620 |
| T7 | 35 | 115 | 100/100 | 14 | 750 | 780 |

TABLE 2

| Example | Composition (base polymer, additives, crosslinkers) | | | Thickness [μm] | Coat-weight [g/m$^2$] | 90° bond strength to steel [N/cm] | | Holding power 10N 23° C. [min] | | Rolling ball tack [mm] | | SAFT [μm] | |
|---|---|---|---|---|---|---|---|---|---|---|---|---|---|
| | | | | | | open side | lined side | open side | lined side | open side | lined side | open side | lined side |
| T1 | B2 | — | 0.21% Bayhydur VP LS 2150/1 | 770 | 730 | 14.5 | 14.5 | 247 000 | 25 000 | 40 | 42 | 687 μm (200° C.) | 680 μm (200° C.) |
| T2 | B1 | 6.5% Hollow glass beads Q-CEL 5028 | 2.13% Bayhydur VP LS 2150/1 | 715 | 625 | 7.9 | 7.8 | 12 050 | 13 000 | 230 | 225 | 123 μm (200° C.) | 125 μm (200° C.) |
| T3 | B2 | 6.5% Hollow glass beads Q-CEL 5028 | 0.11% Bayhydur VP LS 2150/1 | 720 | 705 | 10.9 | 10.9 | 2154 | 2204 | 14 | 16 | 900 μm (200° C.) | 920 μm (200° C.) |
| T4 | B2 | — | 0.83% Tolonate XIDT 70B | 485 | 475 | 8.8 | 8.7 | 14 000 | 13 800 | 95 | 96 | 275 μm (200° C.) | 280 μm (200° C.) |
| T5 | B2 | 6.5% Hollow glass beads | 0.14% Tolonate XIDT 70B | 625 | 590 | 9.7 | 9.8 | 7568 | 7457 | 20 | 19 | 785 μm (200° C.) | 768 μm (200° C.) |
| T6 | B3 | — | 0.25% Bayhydur VP LS 2150/1 | 620 | 600 | 8.6 | 8.6 | 15 458 | 15 649 | 125 | 122 | 235 μm (200° C.) | 240 μm (200° C.) |
| T7 | B1 | 20% DT 110 | 0.25% Bayhydur VP LS 2150/1 | 780 | 750 | 18.0 | 17.9 | 2034 | 2020 | 10 | 9 | 971 μm (200° C.) | 978 μm (200° C.) |

The invention claimed is:

1. A method of producing a self-adhesive tape having at least one layer of a photoinitiator-free pressure-sensitive acrylate hotmelt adhesive with a thickness of 200 to 2,000 µm, in which at least one crosslinker is added in the melt to a polyacrylate copolymer ("polyacrylate") based on acrylic esters and/or methacrylic esters, and the polyacrylate with the crosslinker added is conveyed to a coating unit, where coating takes place onto a temporary carrier material and crosslinking takes place after coating, wherein the crosslinker is a thermal crosslinker and a part of the acrylic esters and/or methacrylic esters contains primary hydroxyl groups.

2. The method of claim 1, wherein the thermal crosslinker is added in an extruder.

3. The method of claim 1, wherein said at least one thermal crosslinker is at least one isocyanate.

4. The method of claim 3, wherein said at least one isocyanate is at least one trimerized isocyanate.

5. The method of claim 4, wherein said at least one trimerized isocyanate is at least one aliphatic and/or amine-deactivated isocyanate.

6. The method of claim 1, wherein the temperature of the polyacrylate when the thermal crosslinker is added is between 60° C. and 120° C.

7. The method of claim 6, wherein said temperature is between 70° C. and 100° C.

8. The method of claim 1, wherein the residual monomer content of the polyacrylate when the crosslinker is added is not more than 1% by weight, based on the polymer.

9. The method of claim 1, wherein the fraction of the acrylic esters and/or methacrylic esters containing primary hydroxyl groups is up to 25% by weight, based on the polyacrylate.

10. The method of claim 1, wherein the polyacrylate is the product of following reactant mixture:
 a1) 65% to 99% by weight acrylic esters and/or methacrylic esters of the general formula
 $CH_2=CH(R^I)(COOR^{II})$
 where $R^I$=H or $CH_3$
 $R^{II}$=alkyl chain having 1 to 20 carbon atoms,
 a2) 1% to 20% by weight acrylates and/or methacrylates whose alcohol component contains at least one primary hydroxyl group, and/or vinyl compounds which are copolymerizable with acrylates and contain at least one primary hydroxyl group, with a fraction of 1% to 20% by weight, and
 a3) if the fractions of a1) and a2) do not add up to 100% by weight, 0% to 15% by weight olefinically unsaturated copolymerizable monomers containing functional groups.

* * * * *